United States Patent
Kao et al.

(10) Patent No.: US 7,868,713 B2
(45) Date of Patent: Jan. 11, 2011

(54) IMPEDANCE MATCHING CIRCUIT AND IMPEDANCE MATCHING SYSTEM EMPLOYING THE IMPEDANCE MATCHING CIRCUIT

(75) Inventors: Yi-Hsiang Kao, Miao-li (TW); An-Xing Jiang, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 233 days.

(21) Appl. No.: 12/077,370

(22) Filed: Mar. 19, 2008

(65) Prior Publication Data

US 2008/0231390 A1    Sep. 25, 2008

(30) Foreign Application Priority Data

Mar. 19, 2007    (TW)    ............... 96109269 A

(51) Int. Cl.
H03H 7/38    (2006.01)
(52) U.S. Cl. ........................ 333/17.3; 333/32
(58) Field of Classification Search ............... 333/17.3, 333/32
See application file for complete search history.

(56) References Cited

U.S. PATENT DOCUMENTS

| 7,068,065 | B1 | 6/2006 | Nasrullah |
| 7,323,901 | B2 | 1/2008 | Aoyama et al. |
| 7,332,980 | B2 | 2/2008 | Zhu et al. |
| 2005/0140424 | A1 | 6/2005 | Uematsu |
| 2008/0123771 | A1* | 5/2008 | Cranford et al. ............ 375/285 |

FOREIGN PATENT DOCUMENTS

| CN | 1578143 A | 2/2005 |
| CN | 1638279 A | 7/2005 |

* cited by examiner

*Primary Examiner*—Stephen E Jones
(74) *Attorney, Agent, or Firm*—Wei Te Chung

(57) ABSTRACT

An exemplary impedance matching circuit (20) includes a signal processing circuit (22) and a variable resistance unit (24). The signal processing unit is configured for identifying a frequency of a signal from an external transmission line (23), generating an identification signal according to the frequency. The variable resistance unit is configured for selecting a resistance matched with an actual impedance of the transmission line.

7 Claims, 2 Drawing Sheets

IMPEDANCE MATCHING CIRCUIT AND IMPEDANCE MATCHING SYSTEM EMPLOYING THE IMPEDANCE MATCHING CIRCUIT

FIELD OF THE INVENTION

The present invention relates to an impedance matching method, an impedance matching circuit, and an impedance matching system employing such impedance matching circuit.

GENERAL BACKGROUND

Impedance matching systems have been more and more widely and gradually used several decades. Generally, an impedance matching system includes a host and display connected with the host via a transmission line. The display can be a traditional CRT (cathode ray tube) display, a prevailing LCD (liquid crystal display), or other type display devices. The transmission line can be a metal wire or any other lines that can transmit signals between the host and the display.

Referring to FIG. 3, a typical impedance matching system includes a host 11, a transmission line 13, a display device 15, and a resistor 17. The host 11 includes a processor 111, a display controller 113 and a display signal output terminal 115. The display device 15 includes a display signal input terminal 151, a processing unit 153, and a screen 155. The display signal output terminal 115 is connected to the display signal input terminal 151 via the transmission line 13. The resistor 17 is connected between an end of the transmission line 13, adjacent to the display signal input terminal 151, and ground.

The processor 111 provides various data signals to the display controller 113. The display controller 113 generates a plurality of display signals according to the data signals, and sends the display signals to the display signal output terminal 115. The display signal input terminal 151 receives the display signals from the display signal output terminal 115 via the transmission line 13, and then sends the display signals to the processing unit 153 for a further processing procedure, which are finally applied to the screen 155 for image display.

The transmission line 13 is usually marked with a characteristic impedance which represents a reference impedance adapted to most situations. When a resistance of the resistor 17 is equal to the characteristic impedance, the impedance of the transmission line 13 is matched or closely matched. In this case, percentages of loss of the display signals caused by signal reflection at ends of the transmission line 13 can be reduced or eliminated.

However, an actual impedance of the transmission line 13 is variable and not equal to the characteristic impedance in most cases. When different display signals having different frequencies are applied to the transmission line 13, the actual impedance of the transmission line 13 is correspondingly different. Therefore, the resistance of the resistor 17 and the actual impedance of the transmission line 13 are not matched precisely. In order to match the resistance with the resistor 17 to the impedance of the transmission line 13, manual operation is adopted to determine the resistance of the resistor 17 with help of a test instrument (not shown). The test instrument is capable of testing whether the transmission of the display signal is in a best mode, and the resistance of the resistor 17 is determined if the transmission of the display signal is in a best mode. Therefore, the actual impedance of the transmission line 13 and the resistance of the resistor 17 are matched. Although by practicing the above-described impedance matching method, impedance matching can be achieved, the operation of determining the resistance of the resistor 17 is complicated and troublesome.

What is needed, therefore, is an impedance matching method which can overcome the above-described deficiencies. Which are also needed, are an impedance matching circuit and an impedance matching system employing such impedance matching circuit.

SUMMARY

An exemplary impedance matching circuit includes a signal processing circuit and a variable resistance unit. The signal processing unit is configured for identifying a frequency of a signal from an external transmission line, generating an identification signal according to the frequency. The variable resistance unit is configured for selecting a resistance matched with an actual impedance of the transmission line.

Other novel features and advantages will become more apparent from the following detailed description when taken in conjunction with the accompanying drawings.

DETAILED DESCRIPTION OF PREFERRED EMBODIMENTS

Reference will now be made to the drawings to describe preferred and exemplary embodiments in detail.

Figure 1:
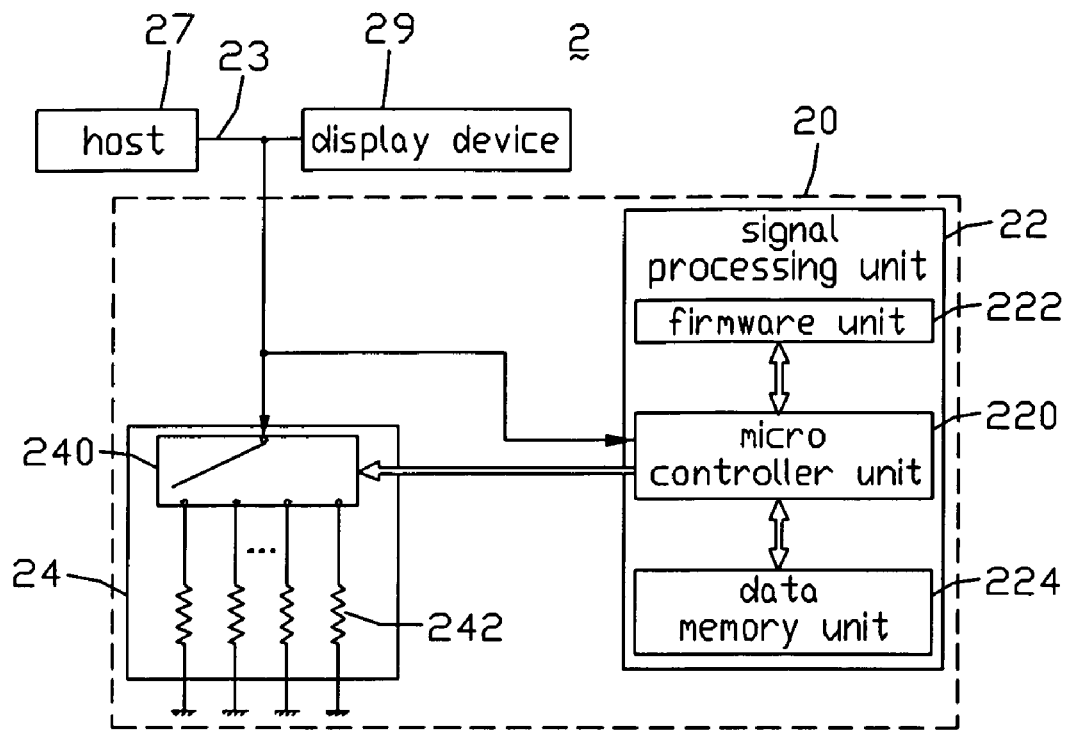
FIG. 1 is an abbreviated block diagram of an impedance matching system according to an exemplary embodiment of the present invention.

Referring to FIG. 1, an impedance matching system 2 according to an exemplary embodiment of the present invention is shown. The computer 2 includes a host 27, a transmission line 23, a display device 29, and an impedance matching circuit 20. The host 27 is connected to the display device 29 via the transmission line 23. The impedance matching circuit 20 is connected to an end of the transmission line 23 adjacent to the display device 29. The host 27 provides a plurality of data signals to the display device 29 via the transmission line 23. The display device 29 may be a liquid crystal display or a cathode ray tube display.

The impedance matching circuit 20 includes a signal processing unit 22 and a variable resistance circuit 24. The signal processing unit 22 includes a firmware unit 222, a micro controller unit 220, and a data memory unit 224. The variable resistance circuit 24 includes a selector 240 and a plurality of resistors 242. The selector 240 essentially is a multiplexer switching integrated circuit including a plurality of first ends (not labeled) each connected to ground through one of the resistors 242, and a second end (not labeled) connected to the transmission line 23. Each of the resistors 242 is provided with a different resistance. The selector 240 is operative of connecting the second end to one of the first ends. Moreover, a range of the resistances of the resistors 242 can cover a range that applicable to a most wide possible range of frequency of the data signal transmitted through the transmission line 23 as long as there are enough resistors 242.

The micro controller unit 220 is configured for receiving the data signal from the transmission line 23 and identifying a frequency of the data signal by a sampling and counting procedure. The procedure of receiving and identifying is defined as an identifying cycle. After the identifying cycle, the micro controller unit 220 generates relevant identification signals according to the frequency of the data signal. The data memory unit 224 stores the identification signal corresponding to the data signal as identification information. The data memory unit 224 can be an electrically erasable programmable read only memory (EEPROM). Furthermore, the micro controller unit 220 sends a start signal continuously and regularly to the firmware 222 so as to start the firmware 222 periodically. The firmware 222 includes a nonvolatile memory such as an erasable programmable read-only memory (EPROM), an EEPROM, and a flash memory. An application software is provided in the nonvolatile memory, and is configured to set different control signals corresponding to various identification signals. The application software includes a pre-stored look-up table (LUT). From the LUT, each identification signal based on a frequency of a data signal corresponds to a control signal, and further corresponds to a specific resistance of the variable resistance circuit 24 that best matches the actual impedance.

After the identification signal is stored in the data memory unit 224, the micro controller unit 220 reads the identification information, thereby generating a control signal corresponding to the identification signal set by the application software. The control signal is applied to the selector 240. The control signal is a digital voltage signal.

The selector 240 is configured for selecting one of the resistors 242 according to the control signal. The selected resistor 242 and the actual impedance of the transmission line 23 can realize a best match such that the impedance matching circuit 20 matches the actual impedance of the transmission line 23 when transmitting the video circuit with the specific frequency. For different data signals, the micro controller unit 220 can provide corresponding different control signals to the selector 240, therefore the selector 240 selects corresponding resistor 242 that best matches the actual impedance of the transmission line 23.

Figure 2:
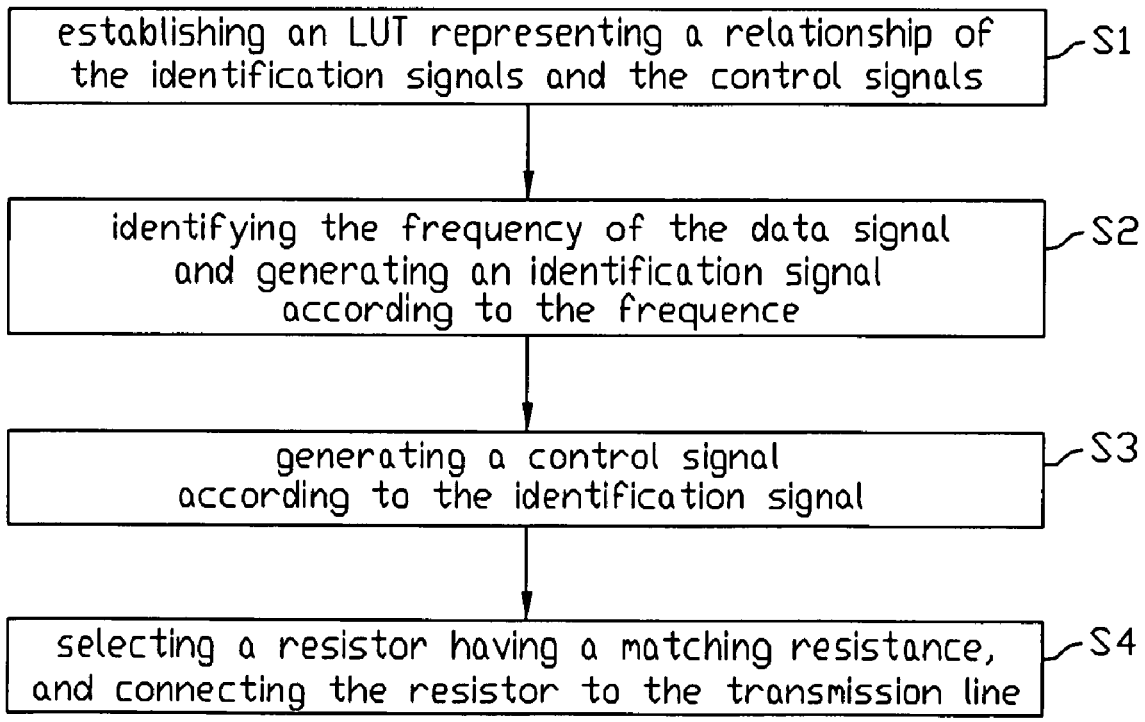
FIG. 2 is a flow chart summarizing an exemplary impedance matching method of the impedance matching system of FIG. 1.
Figure 3:
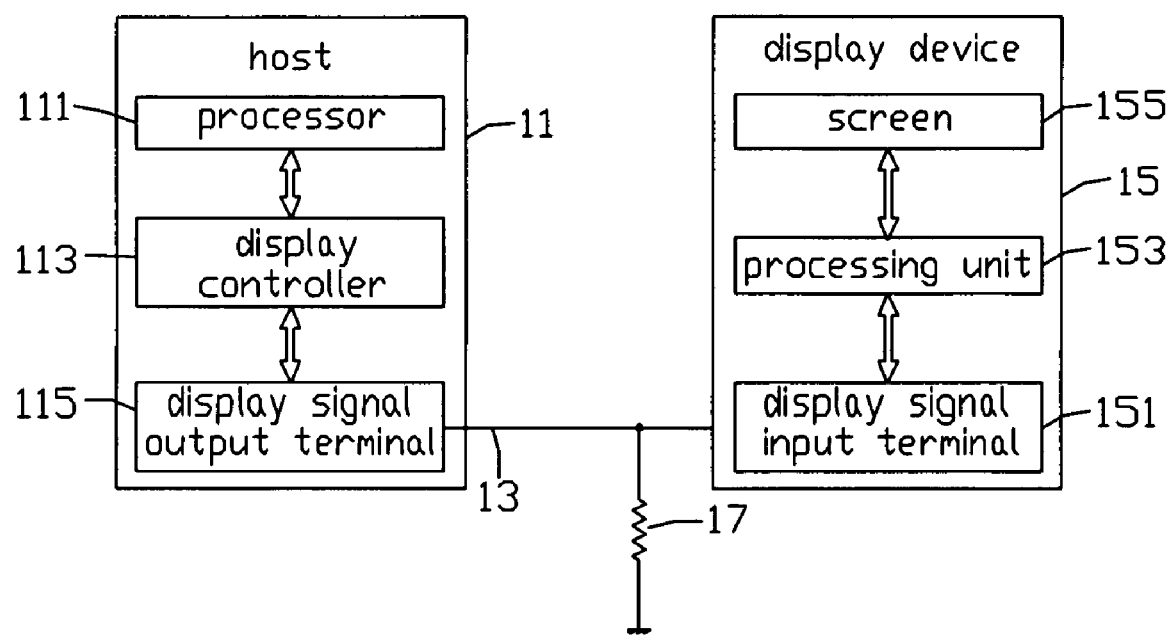
FIG. 3 is an abbreviated block diagram of a conventional impedance matching system.

Referring to FIG. 2, a flowchart summarizing an impedance matching method of the impedance matching system 2 is shown. The method includes: step S1, establishing an LUT representing a relationship of the identification signals and the control signals; step S2, identifying the frequency of the data signal and generating an identification signal according to the frequency; step S3, generating a control signal according to the identification signal; and step S4, selecting a resistor 242 having a matching resistance, and connecting the resistor 242 to the transmission line 23.

In step S1, an LUT representing a relationship of the identification signals and the control signals is established. A manual operation is performed to obtain the LUT during a factory stage. Namely, the frequency of the data signal is identified. A matching resistance is obtained by manually adjusting the resistance around the characteristic impedance of the transmission line 13 until the actual impedance of the transmission line 13 and the adjusted resistance are matched. Therefore, the resistance is the matching one corresponding to the data signal with the frequency. For each of the data signals with other different frequency, the matching operation is repeated. Because the identification signals are based on the frequencies and the control signals are based on the matching resistances, the LUT is established and stored into the firmware unit 222.

In step S2, the frequency of the data signal is identified and an identification signal is generated according to the frequency. The micro controller unit 220 of the signal processing unit 22 receives the data signal from the transmission line 23. The micro controller unit 220 samples and counts the received data signal so as to obtain a frequency of the data signal. The micro controller unit 220 then generates an identification signal according to the frequency.

In step S3, a control signal is generated according to the identification signal. The micro controller unit 220 sends a start signal to the firmware unit 222. The firmware unit 222 starts to work on response to the start signal. The firmware unit 222 includes an application software that can read the identification signal, thereby generating a control signal according to the identification signal.

In step S4, a resistor 242 having a matching resistance is selected, and the resistor 242 is connected to the transmission line 23. The variable resistance circuit 24 receives the control signal. The selector 240 selects one of the resistors 242 having the matching resistance according to the control signal. The selected resistor 242 is substantially connected between the transmission line 23 and ground. Thus, the actual impedance of the transmission line 23 is matched automatically when the data signal is transmitted therethrough.

When the frequency of the data signal varies, the control signal provided by the micro controller unit 220 is correspondingly changed, and the resistance of the variable resistance circuit 24 and the actual impedance of the transmission line 23 are automatically matched. Thus, the impedance matching circuit 20 can automatically match the actual impedance of the transmission line 23 when the frequency of the data signal varies.

Further or alternative embodiments may include the following. In one example, the resistors 242 can also be a digital controllable resistor. The digital controllable resistor has a resistance that varies according to the control signal sent by the micro controller unit 220 and matches the actual impedance of the transmission line 23. In another example, the micro controller unit 220 can also compare the identification signal to the identification signal of previous identification cycle before sending the identification signal to the data memory unit 240. If the distinction of the identification signals of two successive identification cycles is within a predetermined error range, then the resistance of the variable resistance circuit 24 remains; if not, the micro controller unit 220 sends out a start signal to the firmware unit 222. In addition, the selector 240 can also select two or more resistors 242 simultaneously, thus, two or more resistors 242 are connecting to the transmission line in parallel.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. An impedance matching circuit comprising:
 a signal processing unit configured for identifying a frequency of a signal from an external transmission line and generating an identification signal according to the frequency; and
 a variable resistance unit configured for selecting a resistance matched with an actual impedance of the transmission line based on the identification signal;
 wherein the signal processing circuit comprises a micro controller unit, a data memory unit, and a firmware unit, the micro controller unit samples and counts the signal transmitted through the transmission line to identify the frequency of the signal, and generates the identification signal according to the frequency, the data memory unit receives and stores the identification signal, and the firmware generates a corresponding control signal according to the identification signal;

wherein the variable resistance circuit comprises a selector and a plurality of resistors of various resistances, the resistors being connected between the selector and ground, the selector being connected to the transmission line and capable of electrically connecting the resistor with a matching resistance to the transmission line.

2. The impedance matching system as claimed in claim 1, wherein the micro controller unit is capable of sending a start signal to the firmware unit continuously and regularly, and the firmware unit starts to work on receiving the start signal.

3. The impedance matching system as claimed in claim 2, wherein the micro controller unit sends the start signal when error distinctions of two successive identification signals are out of a predetermined error range.

4. The impedance matching system as claimed in claim 1, wherein the firmware unit comprises a nonvolatile memory that stores a relationship between the identification signal and the control signal.

5. An impedance matching system as claimed in claim 4, comprising a host and a display device, the host providing the signals to the display device via the transmission line.

6. An impedance matching system, comprising:

a signal processing unit receiving a current signal from an external transmission line, identifying a frequency of the current signal to generate a corresponding identification signal, and outputting a current control signal according to the corresponding identification signal by using a look-up table (LUT) stored therein, the LUT pre-storing a plurality of control signals corresponding to a plurality of identification signals based on a plurality of different frequencies and representing a relationship of the control signals and the identification signals; and a variable resistance unit receiving the current control signal output by the signal processing unit, and being capable of selecting an optimum impedance matched with an impedance of the transmission line based on the current control signal, wherein the variable resistance unit comprises a selector and a plurality of resistors of various resistances, the resistors connected between the selector and ground, the selector connected to the transmission line receives the current control signal and then selectively electrically connects the resistor with a matching resistance to the transmission line.

7. An impedance matching system, comprising:

a host configured for providing a plurality of signals;

a display device configured for receiving the signals and displaying images;

a transmission line configured for transmitting the signals from the host to the display device; and an impedance matching circuit configured for matching impedance of the transmission line automatically corresponding to the frequencies of the signals, the impedance matching circuit comprising:

a signal processing unit to identify frequency of the signal, and generate an control signal according to the frequency, wherein the signal processing unit comprises a micro controller unit, a data memory unit, and a firmware unit, the micro controller unit being configured for sampling and counting the signal transmitted through the transmission line in order to identifying the frequency of the signal, and generating the identification signal based on the frequency, the data memory unit being configured for receiving and storing the identification signal, the firmware unit being configured for generating the control signal based on the identification signal; and a variable resistance circuit connected to the transmission line and the signal processing unit and configured for selecting a resistance matched with an actual impedance of the transmission line, wherein the variable resistance circuit comprises a selector and a plurality of resistors of various resistances, the resistors being connected between the selector and ground, the selector being connected to the transmission line and capable of electrically connecting the a resistor with a matching resistance to the transmission line.

* * * * *